United States Patent [19]

Hatayama

[11] Patent Number: 4,652,936
[45] Date of Patent: Mar. 24, 1987

[54] SCANNING METHOD AND SYSTEM BEING CAPABLE OF REGISTERING PLURAL REPRODUCTION IMAGES

[75] Inventor: Fumihiro Hatayama, Kyoto, Japan

[73] Assignee: Dainippon Screen Mfg. Co., Ltd., Kyoto, Japan

[21] Appl. No.: 602,469

[22] Filed: Apr. 20, 1984

[30] Foreign Application Priority Data

Jul. 29, 1983 [JP] Japan ................................ 58-140086

[51] Int. Cl.⁴ ...................... H04N 1/04; H04N 1/40; H04N 1/36
[52] U.S. Cl. .................................. 358/285; 358/280; 358/287; 358/75; 358/264
[58] Field of Search ............... 358/285, 286, 287, 288, 358/289, 290, 292, 279, 75, 77, 78, 293, 294, 256, 280, 296, 264; 355/7

[56] References Cited

U.S. PATENT DOCUMENTS

| 4,293,873 | 10/1981 | Barendregt et al. | 358/75 |
| 4,320,419 | 3/1982 | Cottriall | 358/75 |
| 4,327,380 | 4/1982 | Yamada et al. | 358/289 |
| 4,350,997 | 9/1982 | Yamada | 358/77 |

FOREIGN PATENT DOCUMENTS 56-27559 3/1981 Japan .

Primary Examiner—James J. Groody
Assistant Examiner—John K. Peng
Attorney, Agent, or Firm—Lowe Price LeBlanc Becker & Shur

[57] ABSTRACT

In reproducing images, plural reproduction images are registered by correction of their recording positions according to difference between an actual sub-scanning position of a scanning head and the corresponding theoretical sub-scanning position thereof obtained from a computation in the input and the output sides.

16 Claims, 6 Drawing Figures

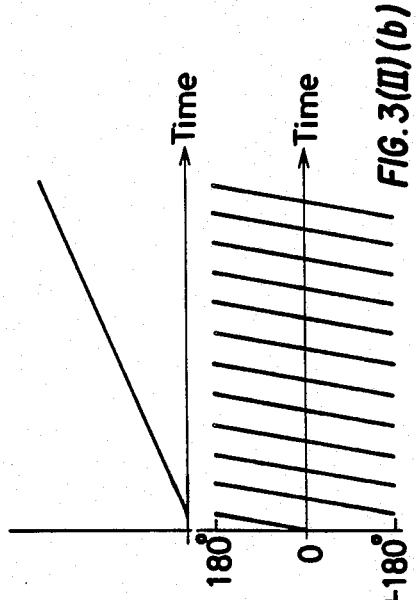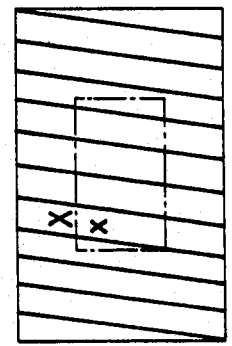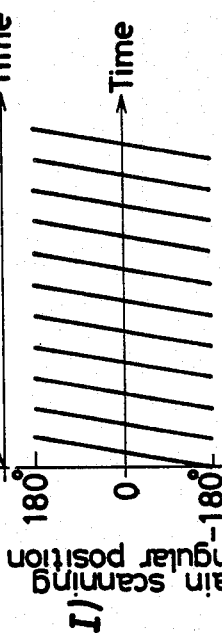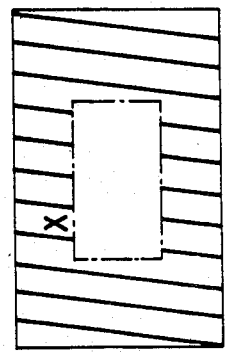

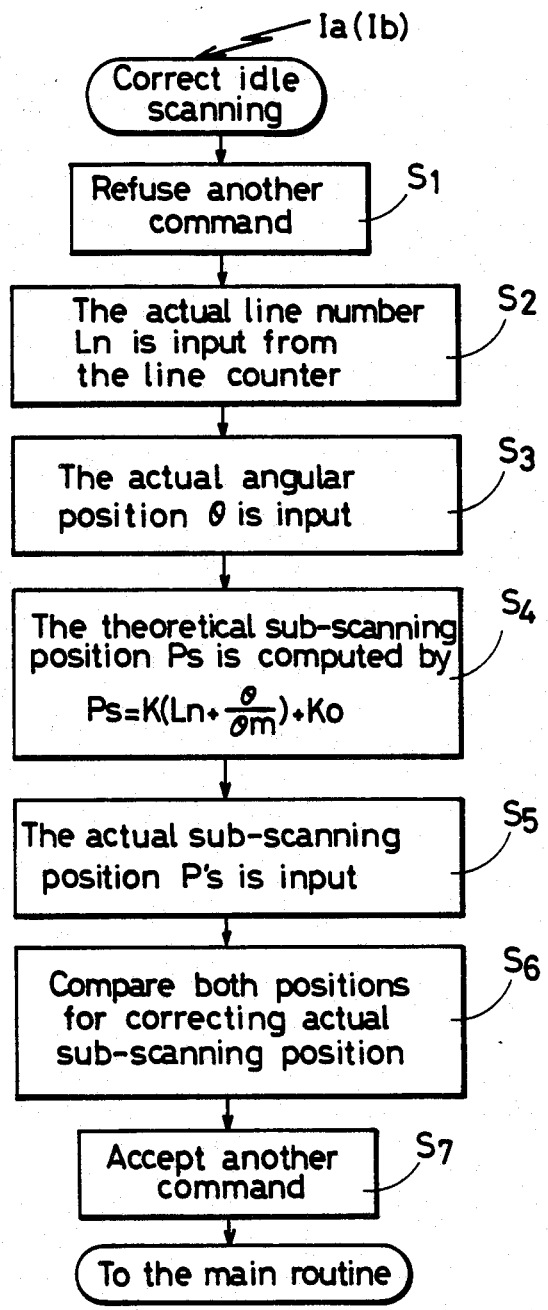

SCANNING METHOD AND SYSTEM BEING CAPABLE OF REGISTERING PLURAL REPRODUCTION IMAGES

FIELD OF THE INVENTION

This invention relates to a scanning method and system capable of registering plural reproduction images, particularly to such a method and system capable of rendering an actual sub-scanning position to correspond to the theoretical sub-scanning position thereof.

BACKGROUND OF THE INVENTION

When plural original pictures are to be scanned successively for use as image data for recording a photosensitive film in a desired layout pattern, reproduction images of the original pictures on the photosensitive film must be registered.

However in a drum scanner system, in order to vary the relative feeding speed between an input head for scanning original pictures and a recording head for exposing photosensitive films according to a desired magnification ratio, usually each head is given an individual motor individually. Because of the same reason, an input drum and a recording drum are usually given motors individually. In this arrangement, as said four motors are different in their startup characteristics, ordinarily a synthesized reproduction image of the original pictures has a shear as mentioned below.

FIG. 1(I)(II) show a case of image reproduction in which a reproduction image B' shown in FIG. 1(II) is recorded in a window of a reproduction image A' shown in FIG. 1(I). Supposing that the reproduction image A' is recorded at a theoretical location on a photosensitive film by beginning a recording process from the point which is both the zero point of the sub-scanning direction factor and the −180° point of the recording drum of the main scanning direction factor, while the reproduction image B' is recorded on the photosensitive film by beginning a recording operation from the point whch is both the point $\alpha$ of the sub-scanning direction factor and the 0° point of the recording drum of the main scanning direction factor. Thus, there exists a phase difference of 180° (time lag $t_0$) in the main scanning direction between the the reproduction images. The time lag $t_0$ corresponds to a shear width $\alpha$ as presented by the scanning line X' of the image A' and the scanning line x' of the image B' in FIG. 1(II). Especially when four color separation images are recorded on one photosensitive film at different times, said shear becomes fatal in reproducing an image of good quality.

To resolve this problem, Japanese Patent Application No. 54-104323 (early opening publication No. 56-27559) discloses the following method. That is, the input (output) scanning is performed by synchronizing a sub-scanning pulse obtained from a sub-scanning pulse generator operating in connection with a scanning head with pulses obtained from the revolution of a scanning drum.

However, the above method has a defect. That is, for example if said pulses synchronize with each other on the Nth scanning line at a first time as shown in FIG. 2(b) ①, at a second or subsequent time they don't always synchronize with each other on the Nth scanning line as shown in FIG. 2(b) ②. They synchronize with each other on one of N±P (P: an integer) lines (the operation error range in the startup stage). If plural scanning processes of the input side are performed ideally (synchronously) and corresponding recording operations of the output side are performed as in the abovementioned condition, naturally the reproduction image has a shear corresponding to the difference between the two scanning line numbers.

SUMMARY OF THE INVENTION

A prime object of this invention is to improve accuracy of reproducing image by rendering an actual sub-scanning position agreeing with the corresponding theoretical sub-scanning position thereof derived from the scanning line number and the angular position of the main scanning direction factor.

The theory of this invention is as follows.

The theoretical sub-scanning position $P_s$ is derived from an equation:

$$P_s = K\left(L_n + \frac{\theta}{\theta_m}\right) + K_O \quad (1)$$

wherein

K: a feeding path of a head in the sub-scanning direction
$L_n$: the number of a main scanning line
$\theta$: an anguular position of the main scanning direction factor with respect to the angle 0° of the standard position.
$\theta_m$: the maximum angular position which corresponds to the angle of 360°.
$K_o$: a shift distance of an input (output) head in the sub-scanning direction.

In the equation (1), K is a constant value determined by the feeding speed (having a relation with the magnification ratio) of an input (output) head. Assuming that the feeding pitch of the input side is $K_a$ and that of the output side is $K_b$, the magnification ratio M is $M=K_b/K_a$, while $\theta_m$ is constant, and $K_0$ is the distance between the beginning point of scanning ($L_n=0$) and the initial position, or zero point of the head (the point where $K_o=0$) in the sub-scanning direction. Therefore the equation (1) becomes solvable by obtaining $L_n$ and $\theta$ as mentioned below. As a result $P_s$ can be found.

On the other hand, the actual sub-scanning point $P'_s$ of a scanning head can be found as the number of the output pulse of a rotary encoder or a linear encoder being linked to the head.

So, to cause the actual sub-scanning point $P'_s$ to correspond to the theoretical sub-scanning point $P_s$, at first they are compared to each other. When $P_s > P'_s$, the scanning head is fed faster. When $P_s < P'_s$, the scanning head is fed slower. This synchronizing procedure must be performed on both of the input side and the output side.

The above and other objects and features of this invention can be appreciated more fully from the following detailed description when read with reference to the accompanying drawings.

BRIEF DESCRIPTION OF THE DRAWINGS

FIG. 3 shows the concept of the method of this invention for reproducing plural images without producing shears.

FIG. 5 shows a flow chart of a program for a situation when a CPU is used as a sub-scanning controller.

PREFERRED EMBODIMENT OF THE INVENTION

FIG. 3 shows the concept of the method of this invention in which a reproduction image B is recorded in the window of a reproduction image A. In this, the scanning line X of the reproduction image A and the scanning line x of the reproduction image B situate on an identical line to be perfectly synthesized with each other.

Figure 1:
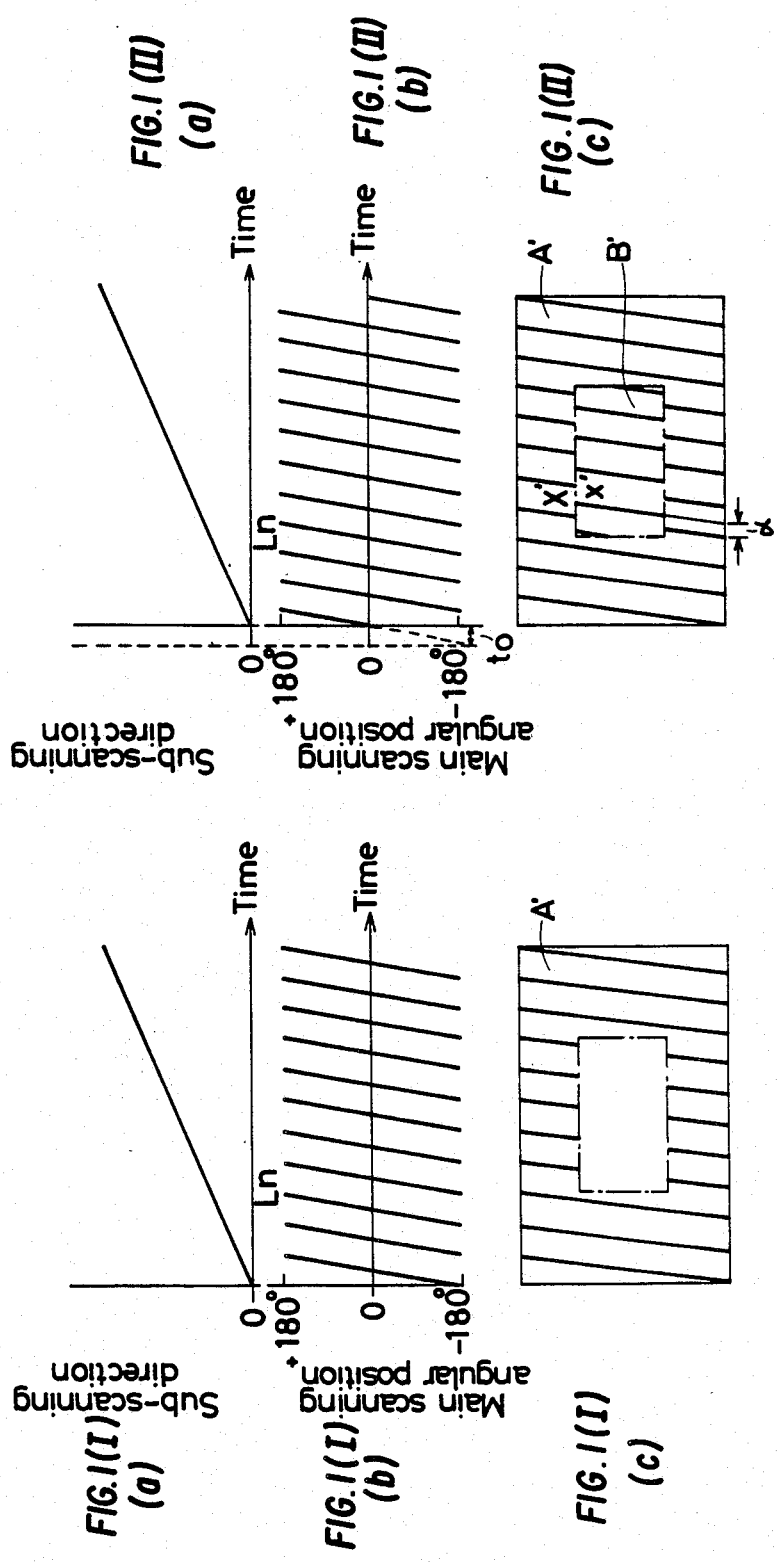
FIG. 1 shows the concept of a conventional method for reproducing plural images.
Figure 2:
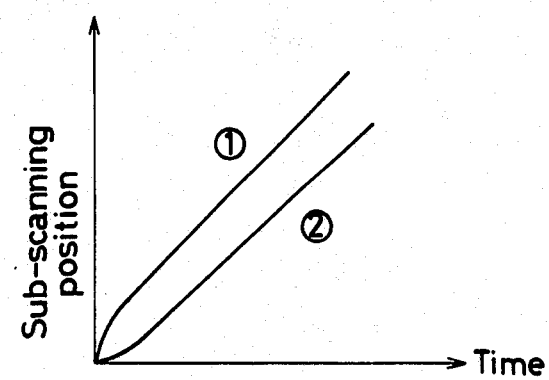
FIGS. 2(a) and 2(b) show (a) a relation between a sub-scanning direction position and the corresponding main scanning direction position, and (b) a relation between a sub-scanning direction position and the corresponding time.
Figure 2:
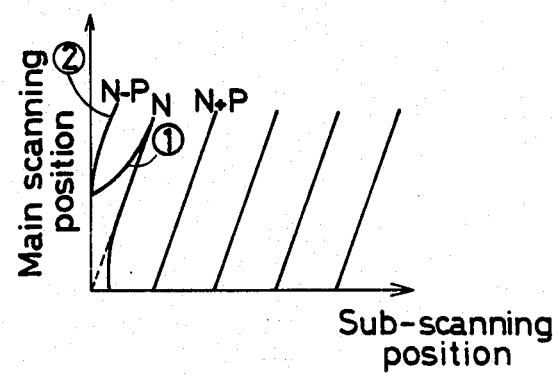
Figure 4:
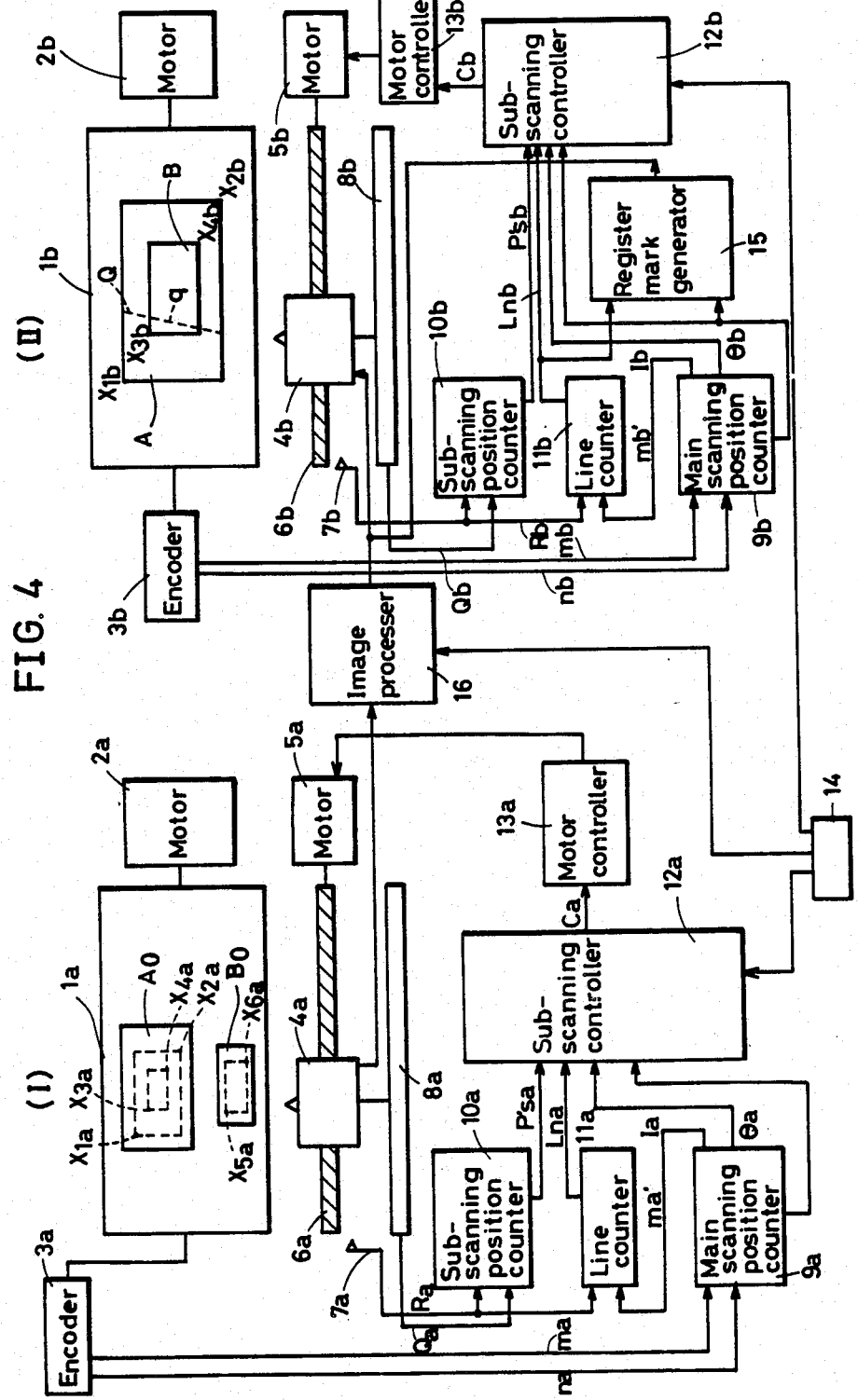
FIG. 4 shows a system for embodying the method of this invention.

FIG. 4 shows a system for embodying the method of this invention, in which the input side (I) and the output side (II) are constructed similarly. The following explanation is based on the input side. A rotary encoder $3_a$ is coaxially connected to an original picture drum $1_a$, which is revolved by a motor $2_a$. The rotary encoder $3_a$ outputs a plurality of main scanning position pulses ($n_a$) every revolution of the original picture drum $1_a$ to a main scanning position counter $9_a$. The count number of the counter $9_a$ is reset to zero on command of a reset pulse ($m_a$) which is output from the rotary encoder $3_a$ every one revolution of the original picture drum $1_a$.

Meanwhile, an input head $4_a$ is provided against the original picture drum $1_a$ and is fed in the sub-scanning direction along a feeding gear $6_a$ revolved by a motor $5_a$. A linear encoder $8_a$ detects the position of the input head $4_a$ and outputs sub-scanning position pulses ($Q_a$) to a sub-scanning position counter $10_a$. The count number of the counter $10_a$ is a reset to zero on command of a reset pulse ($R_a$) output from a zero position detector $7_a$ which detects the return of the input head $4_a$ to the zero point.

The counter $9_a$ generates line number pulses ($m_a'$) by using the reset pulse ($m_a$) and input it to a line counter $11_a$ for counting the scanning line number. The count number of the line counter $11_a$ is reset to zero by said reset pulse ($R_a$).

As the constitution of the output side (II) is as same as that of the input side (I) excepting for a register mark generator (mentioned later), no detailed explanation for the output side is given here. What is noticeable is that units of the input side are expressed by a combination of "a number" and the letter "a" such as "$1_a$", and units of the output side are expressed by a combination of "a number" and the letter "b" such as "$1_b$".

Image data of an original picture obtained by the input head $4_a$ are input via an image processer 16 to a recording head $4_b$. The image processer 16 comprises buffer memories to store the image data of plural scanning lines, to or from which memories the image data are written or read alternately. In this writing and reading processes, a shift amount in the main scanning direction (corresponding to the angular position $\theta$) can be varied by controlling the writing addresses or the reading addresses of the memory (for example, the writing process is started from an advanced address).

By using the thus constructed system, said parameters of the equation (1) can be obtained. In the following explanation, parameters of the input side (I) are given the letter "a", such as "$\theta_{ma}$" and those of the ouput side (II) are given the letter "b", such as "$\theta_{mb}$". That is, to a sub-scanning controller $12_a$ ($12_b$), there input the maximum angular position data $\theta_{ma}$ ($\theta_{mb}$), data of the feeding pitch in the sub-scanning direction $K_a$ ($K_b$) and data of the shift distance of the input (output) head in the sub-scanning direction $K_{0a}$ ($K_{0b}$) from a data setter 14. On the other hand, data of the scanning line number $L_{na}$ ($L_{nb}$) from the line counter $11_a$ ($11_b$), and data of the actual sub-scanning position counter $10_a$ ($10_b$) are also input to the sub-scanning controller $12_a$ ($12_b$). Then the sub-scanning controller $12_a$($12_b$) performs the following computation. In short, a motor control signal ($c_a$) (($c_b$)) obtained by comparing an actual sub-scanning position $P'_s$ to the corresponding theoretical sub-scanning position $P_s$ thereof is used for controlling the motor $5_a$ ($5_b$) via a sub-scanning motor controller $13_a$ ($13_b$).

A CPU can be used as the sub-scanning controller $12_a$ ($12_b$). When it is used, the equation (1) is computed in a way as expressed in a flow chart of FIG. 5.

At first, data of a scanning start point $X_{1a}$ ($X_{1b}$), a scanning end point $X_{2a}$ ($X_{2b}$), a window start point $X_{3a}$ ($X_{3b}$) and a window end point $X_{4a}$ ($X_{4b}$) of an original picture $A_0$ corresponding to the reproduction image A are input to the sub-scanning controller $12_a$ ($12_b$) beforehand from the data setter 14 by using an input device such as a digitizer or a CRT display system.

Before an input (output) scanning, the input (output) head $4_a$ ($4_b$) is set up at the location (zero point) where the head touches the zero position detector $7_a$ ($7_b$).

Then by shifting the head $4_a$ ($4_b$) to the point $X_{1a}$ ($X_{1b}$) of the original picture $A_0$ (the reproduction image A), the parameters of the shift distance of the head in the sub-scanning direction $K_{0a}$ ($K_{0b}$) and the main scanning angular position $\theta_a$ ($\theta_b$) of the point $X_{1a}$ ($X_{1b}$) can be obtained. These parameters are input via the data setter 14 to the sub-scanning controller $12_a$ ($12_b$) and to the internal memory of the image processer 16. Then the head $4_a$ ($4_b$) is brought to an idle scanning start point. This procedure can be performed either in a conventional automatic way or in a manual way. The idle scanning can also be started from the zero point.

After the idle scanning is started, an interrupting pulse ($I_a$) (($I_b$)) which is output once or several times every one revolution of the original picture (recording) drum $1_a$ ($1_b$), is input to the sub-scanning controller $12_a$ ($12_b$). In between the interrupting pulses, no signals for designating other operations are accepted by the controllers $12_a$ ($12_b$) - - - (S$_1$). Then the sub-scanning controller $12_a$ ($12_b$) reads the count number $L_{na}$ ($L_{nb}$) of the line counter $11_a$ ($11_b$) which means the corresponding scanning line number - - - (S$_2$), and reads the main scanning angular position data $\theta_a$ ($\theta_b$) from a main scanning direction position counter $9_a$ ($9_b$) - - - (S$_3$). By using the above data and the parameters $K_a$ ($K_b$), $K_{0a}$ ($K_{0b}$) and $\theta_{ma}$ ($\theta_{mb}$) of the equation (1) being input beforehand, the sub-scanning controller $12_a$ ($12_b$) computes the corresponding theoretical sub-scanning position number $P_{sa}$ ($P_{sb}$) - - - (S$_4$). Then the sub-scanning controller $12_a$($12_b$) compares the count number $P'_{sa}$ ($P'_{sb}$) of the sub-scanning position counter $10_a$ ($10_b$) to the number $P_{sa}$($P_{sb}$) to output a correction signal ($C_a$) (($C_b$)) corresponding to the difference number between them to the sub-scanning motor controller $13_a$ ($13_b$) - - - (S$_6$). After finishing the abovementioned routine from (S$_1$) to (S$_6$), the sub-scanning controller $12_a$ ($12_b$) becomes receptive to said interrupting pulse again. Therefore by repeating the above routine several times, the actual sub-scanning position $P'_{sa}$ ($P'_{sb}$) becomes synchronized whith the corresponding theoretical sub-scanning position $P_{sa}$ ($P_{sb}$) thereof before the idle scanning comes to the actual scanning start point $X_{1a}$ ($X_{1b}$).

Next, the reproduction image B is recorded in the window of the reproduction image A in the same manner. In this case, to render the scanning line Q of the reproduction image A and the scanning line q of the reproduction image B situated on an identical line, at first each parameter is determined to render a theoretical sub-scanning position of the reproduction image B corresponding to that of the reproduction image A, and then an actual sub-scanning position of the reproduction image B is rendered to agree with the corresponding theoretical sub-scanning position thereof. To perform this step, the scanning start and stop points can be designated either on the input side or on the output side.

Incidentally, a register mark generator 15 shown in FIG. 4 (II) operates as follows. For example, a register mark for each photosensitive film of color separation images Y (yellow), M (Magenta), C (Cyan) and K (Black) is registered into the internal register of the register mark generator 15. Then the register mark generator 15 outputs the register mark data to an identical point of each photosensitive film. By using the above method, each color separation image can be recorded on an identical position of respective photosensitive film. Although in FIG. 5 the register mark generator 15 is provided on the output side, it can also be on the input side.

Other from the linear encoder shown in FIG. 4, a rotary encoder connected coaxially to the feeding gear $6_a$ ($6_b$) can be used as a sub-scanning position detector.

Although the original picture drum and the recording drum are revolved individually in FIG. 4, they can also operate when connected and revolved coaxially.

The line counter can also be realized with soft ware using the main scanning reset pulse ($m_a$) (($m_b$)) output once per revolution of the original picture (recording) drum.

As mentioned above, by using the method of this invention, plural reproduction images can be recorded on an identical position of respective photosensitive films, because the method of this invention is capable of controlling the sub-scanning operation in order to render an actual sub-scanning position in agreement with the corresponding theoretical sub-scanning position thereof. When plural original pictures must be reproduced on a photosensitive film in multiple exposure processes, the method of this invention is capable of synthesizing them without producing any shears. When color separation images Y, M, C and K are recorded on a photosensitive film, a synchronous relation there between can be maintained by marking a register mark to respective places of the color separation images.

What is claimed is:

1. In a scanning method for an image reproducing system an improvement providing registration of plural reproduction images, comprising the steps of:
   (a) comparing an actual sub-scanning position of a scanning head to a corresponding desired sub-scanning position thereof computed as a function of a main scanning line number and a main scanning angular position of a scanning head; and
   (b) correcting the actual sub-scanning position according to a difference value between said computed and said actual positions.

2. A method claimed in claim 1 comprising the step of marking a register mark on the desired sub-scanning position.

3. A scanning system registering plural reproduction images in an image reproduction system comprising:
   (a) a means for computing an actual sub-scanning position of a scanning head;
   (b) a means for computing a corresponding desired sub-scanning position by using data representative of a main scanning angular position of the scanning head; and
   (c) a means for correcting the actual sub-scanning position according to a difference value between the actual sub-scanning position of the scanning head and the corresponding desired sub-scanning position thereof computed as a function of a main scanning line number and the main scanning angular position of a scanning head position.

4. A system claimed in claim 3 comprising a register mark generating means for generating a register mark according to data representing the desired sub-scanning position output from the means for computing the desired sub-scanning position.

5. A method for performing a plurality of scans in an image system having a scanning head displaceable along a drum in main- and sub-scanning directions comprising the steps of:
   scanning a first image on the drum in said main and subscanning directions, thereby defining a first locus for the scanning head along the drum;
   opening a window in said first image scanned by the scanning head;
   scanning a second image on the drum in said main and subscanning directions, thereby defining a second locus for the scanning head along the drum;
   defining a location of said second image in said window opened in said first image; and
   recording said second image in the location defined therefor within said window;
   wherein said defining step comprises the further step of causing the scanning head to follow substantially identical loci along the drum for said second image and said window in said first and second scanning steps.

6. A method as recited in claim 5 wherein said causing step comprises the further steps of computing in at least one of said first and second scanning steps a desired location of the scanning head in said subscanning direction as a function of the location thereof in the main scanning direction of said at least one of said scanning steps;
   determining an actual location of the scanning head in said subscanning direction of said at least one of said scanning steps;
   comparing the actual and computed locations of the scanning head for said at least one of said scanning steps; and
   synchronizing movements of the scanning head in said main and subscanning directions in said second scanning step with the previous scans in said first scanning step.

7. A method as recited in claim 6 wherein said computing step comprises the step of determining said desired subscanning direction location of the scanning head in accordance with an equation $$P_s = K(L_n + \theta/\theta_m) + K_o$$

wherein
   $P_s$ is the desired subscanning location;

K is a feeding pitch for the head in the sub-scanning direction;

$L_n$ is a line number in the main scanning direction; is an angular position in the main scanning direction;

$\theta_m$ is a maximum angular position of the main scanning direction; and $K_o$ is a shift distance of the scanning head in the subscanning direction.

8. A method as recited in claim 6 wherein said synchronizing step comprises the step of changing a feed rate for the scanning head in the subscanning direction in accordance with the result of said comparing step.

9. A method as recited in claim 6 comprising the further step of generating registration indicia for succeeding scanning steps in accordance with a count in a main scanning position counter to provide registration between successive scanned images.

10. An image reproduction system for performing a plurality of scans in an apparatus having a scanning head displaceable along a drum in main- and sub-scanning direction comprising:

scanning means for performing a first scan along the drum for scanning a first image on the drum in said main and subscanning directions, thereby defining a first locus for the scanning head along the drum;

said scanning means further operable for performing a second scan along the drum for scanning a second image on the drum in said main and subscanning directions, thereby defining a second locus for the scanning head along the drum; and synchronizing means for causing said scanning head to follow substantially identical loci along the drum in scanning said first and second images.

11. An image reproduction system as recited in claim 10 wherein said synchronizing means comprises means for displacing said scanning head in the subscanning direction thereby causing said scanning head to begin said second image scan at a beginning defined relative to said first image.

12. An image reproduction system as recited in claim 10 wherein said synchronizing means further comprises defining means for defining a location for one of said first and second images in a window opened in the other of said first and second images scanned by said scanning head and for causing scan lines of said first and second images substantially to coincide with one another when scanning said window in said other image and said first image, thereby to eliminate shear between a background image and an image recorded in a window therein.

13. An image reproduction system as recited in claim 10 wherein said synchronizing means comprises computing means for computing for at least one of said first and second image scans a desired location of the scanning head in said subscanning direction as a function of the location thereof in said main scanning direction in said at least one of said image scans;

locating means for determining an actual location of the scanning head in said subscanning direction of said at least one of said image scans;

comparing means for comparing the actual and computed locations of the scanning head for said at least one of said image scans; and synchronizing means responsive to said comparing means for synchronizing movements of said scanning head in said main and subscanning directions when scanning said first and second images.

14. An image reproduction system as recited in claim 13 wherein said computing means is operable for computing said desired subscanning direction location of said scanning head in accordance with an equation $$P_s = K(L_n + \theta/\theta_m) + K_o$$

wherein $P_s$ is the desired subscanning location;

K is a feeding pitch of the head in the sub-scanning direction;

$L_n$ is a line number in the main scanning direction; is an angular position in the main scanning direction;

$\theta_m$ is a maximum angular position of the main scanning direction; and $K_o$ is a shift distance of the scanning head in the subscanning direction.

15. An image reproduction system as recited in claim 13 wherein said synchronizing means comprises feed rate control means responsive to said comparing means for changing a feed rate for the scanning head in the subscanning direction in accordance with the result of the comparison performed thereby.

16. An image reproduction system as recited in claim 13 further comprising registration generating means for generating registration indicia for succeeding scanning steps in accordance with a count in a main scanning position counter to provide registration between successive scanned images.

* * * * *